United States Patent [19]
Rubin

[11] Patent Number: 4,788,543
[45] Date of Patent: Nov. 29, 1988

[54] APPARATUS AND METHOD FOR BROADCASTING PRIORITY RATED MESSAGES ON A RADIO COMMUNICATIONS CHANNEL OF A MULTIPLE TRANSCEIVER SYSTEM

[76] Inventor: Richard Rubin, 800 Pine Hollow Rd., Bldg. 22, Apt. 1A, East Norwich, N.Y. 11732

[21] Appl. No.: 927,149

[22] Filed: Nov. 5, 1986

[51] Int. Cl.[4] .............................................. H04Q 7/00
[52] U.S. Cl. ........................... 340/825.44; 340/825.5; 455/58; 455/73
[58] Field of Search ...................... 340/825.44, 825.48, 340/825.5, 825.51; 375/7, 122; 455/31–38, 58, 73, 77, 88, 89; 379/56, 57, 58, 62, 88; 381/29–31, 34

[56] References Cited

U.S. PATENT DOCUMENTS

| | | | |
|---|---|---|---|
| 3,026,375 | 3/1962 | Graham | 375/122 |
| 3,190,965 | 6/1965 | Zarouni | 340/825.5 |
| 4,384,169 | 5/1983 | Mozer et al. | 381/31 |
| 4,503,510 | 3/1985 | Weaver | 375/122 |
| 4,560,832 | 12/1985 | Bond et al. | 379/62 |
| 4,611,334 | 9/1986 | Engel et al. | 340/825.5 |
| 4,642,630 | 2/1987 | Beckner et al. | 340/825.5 |
| 4,646,358 | 2/1987 | Shanley | 455/38 |

Primary Examiner—John W. Caldwell, Sr.
Assistant Examiner—Edwin C. Holloway, III
Attorney, Agent, or Firm—Edward H. Loveman

[57] ABSTRACT

Apparatus in a transceiver for broadcasting priority rated messages on a channel shared by a multiplicity of similar transceivers, converts an analog audio frequency message to compressed digitalized format which is stored, encrypted, and encoded with a priority rating and recipient identity code. A central data processor prevents broadcast of the message while any other message of higher priority rating is being broadcast, or interrupts broadcast of the message when broadcast of another message of higher priority is detected, or interrupts broadcast of any other message of lower priority than that of a message waiting to be broadcast. Received messages bearing the recipient's identity code are stored and played back in order of their priority rating.

12 Claims, 2 Drawing Sheets

APPARATUS AND METHOD FOR BROADCASTING PRIORITY RATED MESSAGES ON A RADIO COMMUNICATIONS CHANNEL OF A MULTIPLE TRANSCEIVER SYSTEM

BACKGROUND OF THE INVENTION

1. Field of the Invention

This invention relates to the art of radio transceiver systems and more particularly concerns transceiver apparatus and a method for broadcasting priority rated messages on a communication channel of a multiple transceiver system.

2. Description of the Prior Art

Vehicles in fleets currently communicate with each other via radio transceivers or two-way radios as they are popularly known. These radio transceivers share the same narrow communication channel or assigned broadcast frequency. In operation, it is necessary that the channel be clear and free from any communication signals in order for a message to be sent by any one transceiver to any one or more other transceivers. The operator of a sending transceiver must wait until the channel is clear before his transmission begins. This waiting is required regardless of the urgency of the message to be sent, and is not only objectionable, but it also can create a hazardous, emergency condition. If the operator does not wait, and he initiates boradcast of a message while a prior message already occupies the available channel, loss of comprehensibility of both messages occurs. In emergency service situations this mixing and consequent garbling of messages can constitute a serious safety hazard. This hazard is particularly objectionable in emergency service fields such as police, fire, ambulance, rescue, military, etc . . . The hazard of a message "traffic jam" also exists in related services and applications employing two-way radio communication systems, such as air traffic control, construction projects, road building, truck convoys, etc . .

SUMMARY OF THE INVENTION

This invention has as a principal object, to overcome the deficiencies mentioned above and other difficulties and disadvantages of prior multiple radio transceiver systems operating on a single channel.

A further object of the present invention is to maximize message throughput by shortening the times of message transmissions.

Still another object of the present invention is to provide a transceiver apparatus and method for:

1. Minimizing waiting time for a transceiver to access a communication channel assigned to a multiple transceiver system.

2. Eliminating the possibility of two or more messages being broadcast at the same time by two or more transceivers with subsequent loss of intelligibility.

3. Prioritizing messages to be transmitted so that messages are transmitted in sequence according to their assigned priorities.

4. Enabling a prioritized message to be transmitted by a transceiver to seize the communication channel from a message of lower priority being transmitted by another transceiver, while the other transceiver senses the interruption and stores the interrupted message for later transmission.

5. Screening incoming messages received to identify the intended party and the message priority.

6. Coding transmitted messages for priority, security, and other purposes.

7. Decoding received messages.

8. Replaying stored interrupted messages when the channel is clear.

9. Using computerized equipment and methods in handling messages as digital data.

10. Providing a degree of privacy to the system against outside receivers by broadcasting messages in digitized form.

11. Shortening transmission time by transmitting message in compressed form.

According to the invention, each transceiver in a system of multiple transceivers has a transmitter section and a receiver section arranged to perform the functions and accomplish the objects listed above. The transmitter section of each transceiver in the system has a microphone connected to an analog-to-digital (A/D) pulse converter. A spoken message applied to the microphone is converted to analog electrical pulse form which is applied to the analog-to-digital convertor, where the message is converted to digital format. Since, as is well known, speech pulses are inherently redundant, the A/D conversions need not be performed continuously, but may be performed at a sampling rate. The digital samples will result in recognizable sounds when converted back to analog form in the receiver section of another transceiver in the system. The digitalized message will be stored in a dynamic random access memory (RAM) stack in the transmitter section of the transceiver sending the message. The receiver section of the transceiver will normally monitor the communications channel at all times in order to detect broadcasts from other similar transceivers in the system. In situations where no other transceivers are using the channel, the digitalized message will be broadcast automatically with the addition of a tone generated by a tone generator at the start of the message indicating the priority of the message about to be broadcasted. At the completion of the message transmission, a second tone will be added by the tone generator to signify the completion of the broadcast transmission.

In situations where broadcast of a message from a first transceiver is in progress on the assigned channel frequency, the receiver section of a second transceiver now desiring to broadcast will compare the priority of its message with the assigned priority of the message in progress. This priority will previously have been placed in the RAM register of the second transceiver at the inception of the monitored in-progress message. If this priority is equal to, or higher than the priority of the new message to be transmitted, the new message will be placed in a memory register of the second transceiver, in digitalized form. Upon completion of the first message, the new message with the addition of priority and completion tones will then be broadcasted. In order to save air time, this new message will be broadcasted after it has been shortened by computer data compression techniques.

If the priority of the message being broadcast on the assigned channel at any time is lower than the new message to be broadcasted, the new message will, through usage of the higher priority tone, demand and receive access to the channel frequency replacing the message being broadcasted. Simultaneously, the new message will be stored in RAM memory in the event the transmission is interupted by a subsequent message of higher priority. The coded priority tones of the inprogress and new messages respectively will determine if the new message is eligible to seize the channel from the in-progress message.

The receiver section of the transceiver will evaluate the priority of each incoming message and will place in random access memory (RAM) both the priority and the message. Any stored messages can be instantly replaced when the operator of the transceiver activates a REPLAY key on the keyboard of the transceiver. These messages remain in memory until they have been deleted by being replayed, or if the memory space is required for new messages. It is anticipated that sixty seconds of messages can be stored in one megabyte of memory.

If during a first transceiver's broadcast of a message, its receiver section detects a tone indicating another transceiver has initiated a higher priority message, the first transceiver will interrupt its own transmission to clear the channel and permit the higher priority message to access the communications channel. At the completion of the higher priority, interrupting message, the first transceiver will retrieve its own interrupted message from memory, add an audible tone indicating an interrupted message is being sent to the intended recipient of the message. Then the transceiver will broadcast in its entirety in compressed form the previously interrupted message. The compressed message will occupy materially less channel time than is utilized in prior known transceiver systems. Since less time is required for transmissions more messages can be sent in a given time, thus increasing efficiency of usage of the sytem and allowing much greater use of the existing channel.

The operator of a transceiver embodying the invention, via a keyboard, may enter a message, a message priority, an identity code for the intended recipient transceiver, and if desired, a scramble code for a message to be secured by encoding. The recipient transceiver will receive only those messages designated specifically for it, and will "hear" those messages in order of decreasing priority. Secured encoded messages can be decoded by using a periodically modified access code. The priority and completion tones added to a transmitted message can be generated by an FM oscillator which uses various algorithms to generate tones. It is anticipated that three different tones will suffice for most applications.

These and other objects and many of the attendant advantages of this invention will be readily appreciated as the same becomes better understood by reference to the following detailed description when considered in connection with the accompanying drawings in which:

DESCRIPTION OF THE PREFERRED EMBODIMENT

Figure 1:
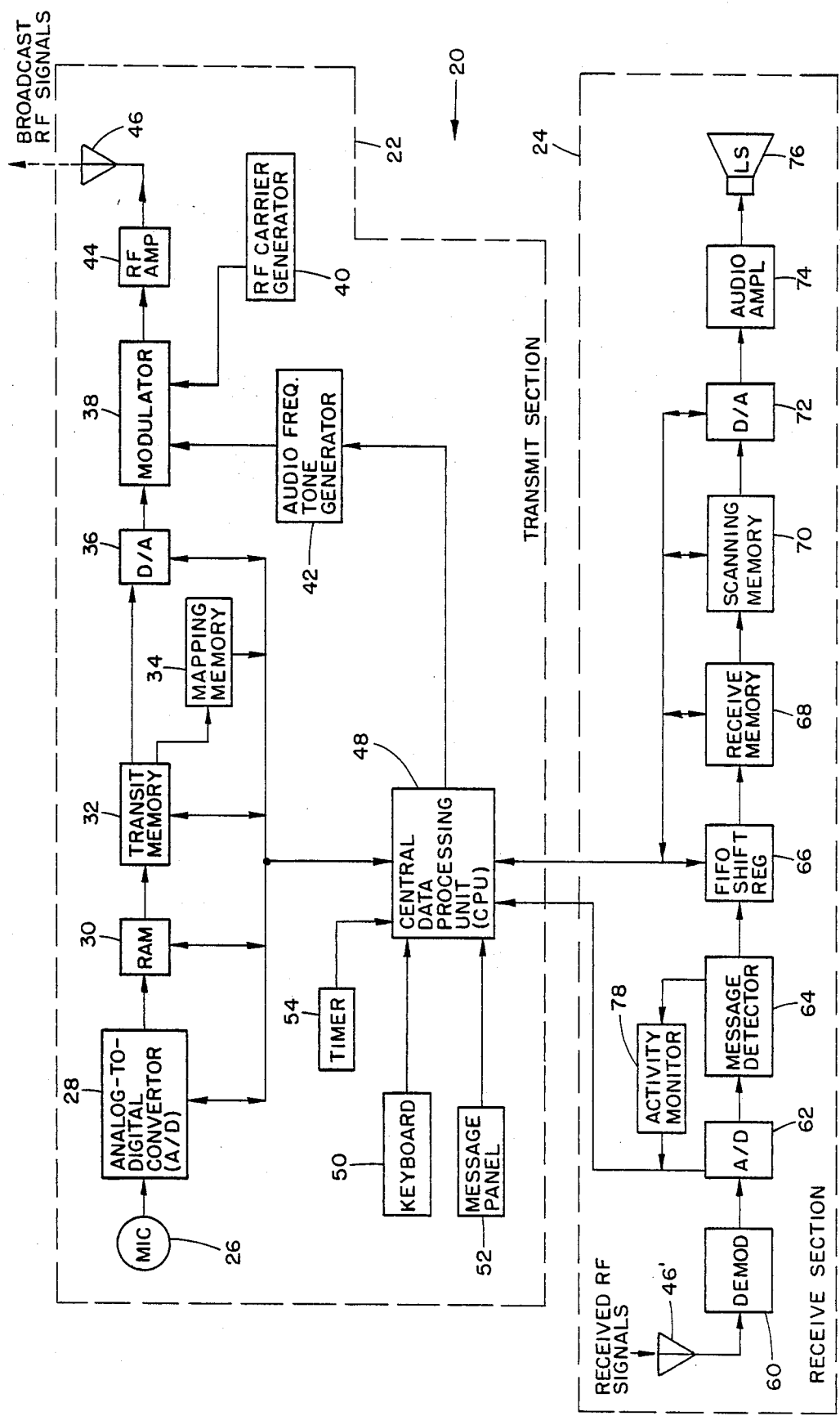
FIG. 1 is a combined block and logic diagram of a transceiver embodying the invention.

Referring now to the drawings wherein like reference characters designate like or corresponding parts throughout, there is illustrated in FIG. 1 a diagrammatic representation of a transceiver or two-way radio generally designated as reference numeral 20 embodying the invention. The transceiver 20 has a transmit section 22 and a receive section 24. In the transmit section 22 is a microphone (MIC) 26 connected to an analog-to-digital convertor 28 (A/D) which receives analog electrical signals corresponding to the sound pulses applied by an operator's speaking into the microphone 26, and converts the analog signals to a digital format. Connected to the A/D convertor 28 is a random access memory (RAM) 30, which stores messages in digital format received from the convertor 28. A transmit memory 32 receives digital data from the memory 30 and passes data to both a mapping memory 34 and a digital-to-analog convertor (D/A) 36 which applies analog message pulses to a modulator 38 to which a radio frequency carrier generator 40 and an audio frequency tone generator 42 are also connected. A properly modulated, coded and compressed radio frequency message is then passed in analog format via an RF amplifier 44 to a broadcast antenna 46.

Figure 2:
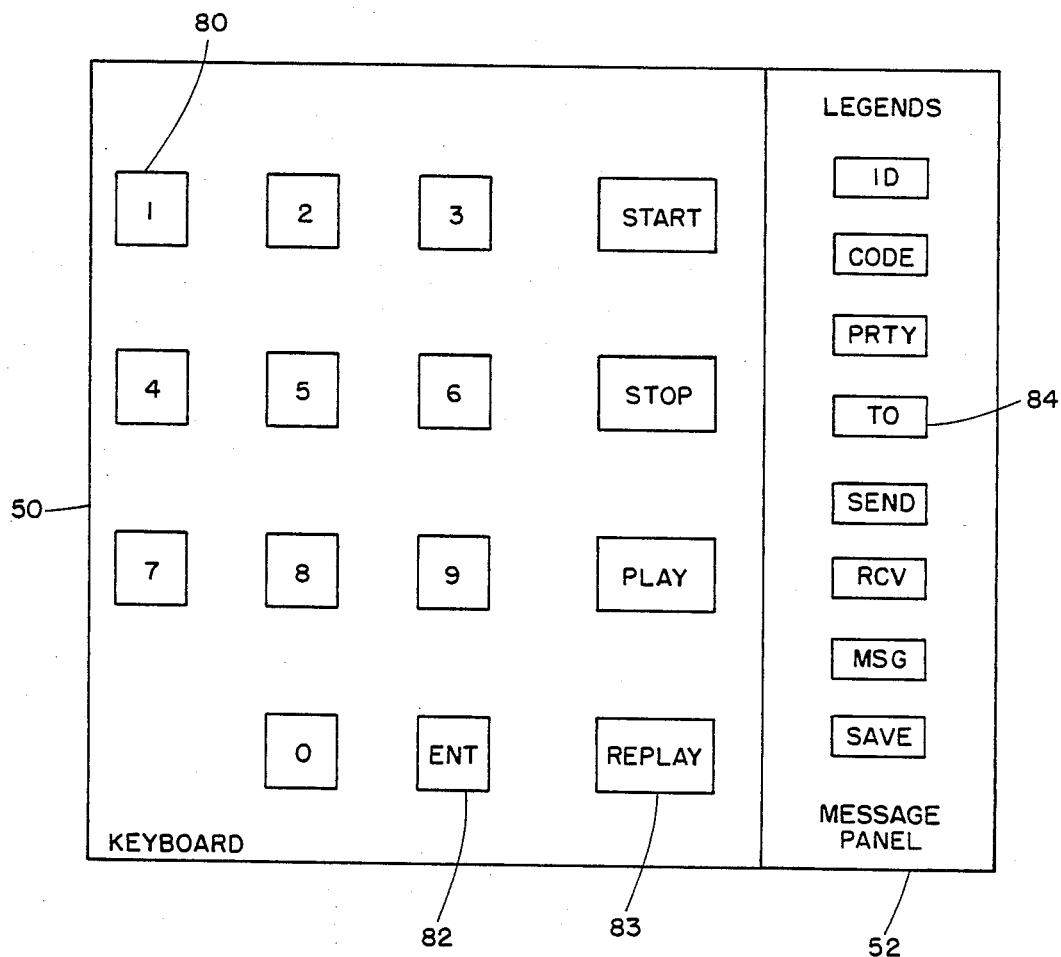
FIG. 2 is an elevational view of a keyboard and message panel of the transceiver of FIG. 1.

Further, according to the invention, there is also provided a central data processing unit (CPU) 48. Connected to the CPU 48 is a keyboard 50 and a message panel 52 shown in more detail in FIG. 2 and more fully described hereinafter. As connected to an input of the CPU 48 is a timer 54. The tone generator 42 is connected to an output of the CPU 48. The convertor 28, the memories 30, 32, and 34 along with the convertor 36 are connected via a logic circuit to the central procesing unit 48. The unit 48 is also connected to components in the receive section 24, as will be hereinafter more fully described.

In the receive section 24 is a broadcast signal receiving antenna 46'. Although this antenna is shown separate from the broadcast antenna 46, a single antenna may be provided to broadcast and receive message signals. The antenna 46' is connected to a demodulator 60 which removes the rf carrier frequency and applies the received message in analog format to an analog-to-digital convertor 62. The convertor 62 is connected to a message detector 64 which in turn is connected to a first-in-first-out (FIFO) shift register 66. The shift register 66 is connected to a receive memory 68 which stores the received message and which feeds the stored message via a scanning memory 70 to a digital-to-analog (D/A) convertor 72, which applies the electrical audio frequency message signals in analog format to an audio amplifier 74 which in turn, drives a loudspeaker (LS) 76.

An activity monitor 78 is connected across the convertor 62 and the message detector 64. The monitor 78 is also connected to the central data processing unit 48. The shift register 66, memories 68, 70, and the convertor 72 are also connected by logic circuitry to the CPU 48.

In operation of the transceiver 20 an operator thereof utilizes the keyboard 50 and the message panel 52 for transmission of messages. The keyboard 50 has ten keys or buttons 80 numbered "0" to "9" and an eleventh key 82 also designated (ENT) for entering a code selected by pushing selected buttons 80; see FIG. 2. One or two or more keys 80 may be used for entry of priority and if desired may be clearly marked and/or color differentiated. The keyboard 50, has four control buttons or keys 83 bearing the legends START, STOP, PLAY AND REPLAY respectively. The message panel 52 has eight legend windows 84 bearing the legends ID, CODE, PRTY, TO, SEND, RCV, MSG, and SAVE respectively. Legends selected by the CPU 48 will light up depending on which function is being performed by the transceiver 20 as will now be described.

The ID legend in one of the windows 84 indicates that a message has been initiated by the transceiver 20. The assignment of priority to the message is indicated by legend PRTY. The addition of an identifier code for the intended recipient of the message to be sent is indicated by legend TO. The addition of an identifier of the transceiver 20 sending the message is also indicated by legend ID. The CODE legend indicated that a periodically modified code number is being utilized for messages to be encrypted or encoded for security purposes.

In operation of the apparatus, the central data processing unit (CPU) 48 when first powered will illuminate the legend ID on the message panel 52. Then the CPU 48 will monitor the keyboard 50 for the input of the operator's preassigned user identification number. This identification is subsequently used by the CPU 48 to screen incoming messages for only that user. If an incoming message is not addressed to a specific transceiver 20, the message will be available for decoding by all transceivers 20 in the system. Additionally, the user identification number will be added to outgoing messages for future data processing uses. After storing the ID number, the CPU 48 will cause the legend CODE to be illuminated at the message panel 52. The CPU 48 will then proceed to monitor the operation of the keyboard 50 for a message scramble code. After receiving this code the CPU 48 will utilize a randomizing algorithm to load the most significant bit in the mapping memory 34 with data based on the operator entered code. This map will sufficiently distort the message data such that without the proper code at the recipient's receiver, the received message will be unintelligle. If no scramble code number is entered at the keyboard, no data encoding or encryption will occur.

Operation of the keyboard 50 will be continuously monitored by the CPU 48 for entry of the message priority. If no priority is entered the apparatus will relegate (Default) the message to the lowest or minimum priority. After storing the priority in the randum access memory 30, the CPU 48 will illuminate the legend TO at the message panel 52. The unit 48 will monitor the keyboard operation for entry of the identify number of the intended recipient. If no recipient ID number is entered, the apparatus will default to the base station identity number. After storing the recipient's identity number in the random access memory 30, the CPU 48 will instruct the analog-to-digital convertor 28 on a periodic basis to start converting analog electrical signals received from the microphone 26, into digital numbers. The microphone functions in a conventional way to convert sound waves produced by the operator's speaking into the microphone 26 into electrical signals having analog format which are received by the analog-to-digital convertor 28.

After allowing sufficient time for the analog-to-digital convertor 28 to stabilize on a given message sample, the unit 48 will store the converted number in the random access memory 30. The unit 48 will then periodically read the timer 54 to determine the time for the next analog-to-digital conversion.

If the channel frequency is not being currently used by another mobile transceiver or a fixed transceiver at a base station, the message in compressed format will be directly broadcast via the convertor 36, the modulator 38, the amplifier 44 and the antenna 46. In all cases the message transmitted will also be stored in dynamic RAM 30. The message will be stored until it is deleted automatically to provide memory space for new messages to be sent.

Whenever the unit 48 has a message in progress the unit monitors the receive message memory 68 in the receive section 24. If no message is stored or being received there, the unit 48 will illuminate the SEND legend at the message panel 52 and will move each word in the transmit memory 32 through the coded mapping memory 34 to the digital-to-analog convertor 36, where the word will be converted to analog format. The word in analog format will be used in the modulator 38 to modulate the carrier radio frequency provided by the carrier generator 40. Then the word as part of the message will be broadcast from the antenna 46.

If the central processing unit 48 detects activity in the receive message memory 68, the unit will illuminate the RCV legend on the message panel 52. Then the received message will be reproduced via the scanning memory 70, the digital-to-analog convertor 72, the audio amplifier 74 and the loudspeaker 76. At the same time, the unit 48 will continuously probe for free time on the communication channel to start sending any message waiting to be sent. This continuous monitoring of the communcation channel by the unit 48 relieves the operator from a very burdensome task, which is experienced in prior transceiver communication systems.

RECEIVING

After the start of a message is detected, the incoming message is passed by the antenna 46' to the demodulator 60 where the radio frequency carrier is removed and the remaining message signals in analog form are applied to the analog-to-digital convertor 62 for continuous conversion to digital format. The digital pulses are passed into the first-in-first-out shift register 66. Whenever the start-of-message detector 64 indicates that there is an incoming message, the activity monitor 78 sends an "active" indication and a priority tone to the central processing unit 48. The CPU 48 transmits the priority tone to the receive memory 68. When the end-of-message tone is received, the activity monitor 78 will send an "inactive" indication to the unit 48 which will then start transmission of any waiting or pending message as described above. After the digitalized signals are received by the shift register 66 and are identified by the unit 48 as being for this recipient transceiver, they are moved by the unit 48 to the receive memory 68 and identified as to priority. When a complete message is received, the unit 48 will select the message having the highest priority stored in the receive memory 68. The unit 48 will then reconstruct the data for real time playback using a decoding algorithm if necessary, and will then place the reconstructed data in the receive memory 68 and pass the data via the scan memory 70 to the digital-to-analog convertor 72. This convertor subsequently passes the analog message signal to the loudspeaker 76 via the audio amplifier 74, thereby reproducing the sound of the message as originally sent to this recipient. In cases where an incoming message being converted to analog form by the convertor 72 is of lower priority than a subsequent incoming message, the conversion to analog of the message of lower priority will be interrupted, saved, in the receive memory 68 by the CPU 48 and reproduced in its entirety at the loudspeaker 76 after the higher priority message has been reproduced at the loudspeaker 76. Saved messages can be replayed in order of decreasing priority by entering the REPLAY command on the keyboard 50. After a received message is complete it will be stored in the receive memory 68 until the memory space is needed. At this time, the stored message can be deleted or it can be moved to an external recording device for permanent storage.

SYSTEM LOGIC

A typical data train of a received or sent message will have the following components in listed order:
1. Priority tone.
2. ID of the sender.
3. ID of intended receiver (optional).
4. Encryption code.
5. Message.
6. Completion code.

The following sequence of logic operations is performed by the apparatus:

I. With no messages in progress or in broadcast memory the communications system is deemed to be in a passive state. If a message is in progress or in broadcast the system is deemed to be active.

II. The operator of a transceiver initiates an outgoing message.
  A. Priority of the outgoing message is entered via the keyboard 50 (or default priority is assigned).
  B. The communication system is checked to determine if it is in passive state.
   1. If the system is determined to be passive, the transceiver will initiate broadcast of a message.
   2. If the system is in an active state, i.e. there is another message on the air as indicated by the message detector 64 then the transceiver will compare the priority of its new message with that of the other message on the air.
   3. If the other message on the air has a higher assigned priority rating, then the new message will remain in the broadcast memory 30 until the communications channel is cleared, as indicated by receipt of the completion tone of the broadcast message.
   4. If the new message to be sent has a higher priority rating than the other message on the air, the transceiver seizes the channel with the priority tone and broadcast of the new message begins immediately.
  C. If, during a broadcast from a first transceiver, its receive section 24 detects a tone preceding a message from another transceiver, the first transceiver will interrupt its own message because the new message must have a higher priority rating, otherwise it would not have been transmitted. After the higher priority message is completed and the channel is clear, the first transceiver will rebroadcast its interrupted message in its entirety since the interrupted message was stored in the broadcast memory 30 of the first transceiver.

III. The receive section 24 and the memory 68 associated with it have the responsibility of permitting each transceiver's transmit section 22 to send a message.

APPARATUS ESSENTIALS

The apparatus has the following essential capabilities:
1. Means are provided to eliminate the possibility of two messages interfering with one another and preventing subsequent loss of data.
2. Means are provided for minimizing waiting time and maximizing message throughput of the radio communications channel of the system.
3. Means are provided for prioritizing messages for subsequent replay.
4. Means are provided for screening incoming messages as to identity of recipient and priority of message.
5. Means are provided for coding and decoding voice frequency messages.
6. Means are provided for replaying received messages, and manipulating received messages through computer techniques. Such manipulation includes storing messages in memory devices such as hard discs, optical discs or tape. Data stored in such a manner can be analyzed using standard computer techniques. Written transcripts can be printed or viewed on display devices.
7. Means are provided for affording a degree of privacy and security by broadcasting messages in digitally compressed form and in encrypted form.

It should be understood that the foregoing relates to only a preferred embodiment of the invention which has been by way of example only, and that it is intended to cover all changes and modifications of the example of the invention herein chosen for the purpose of the disclosure, which do not constitute departures from the spirit and scope of the invention.

What is claimed is:
1. Apparatus in a transceiver for broadcasting priority rated messages on a channel shared by a multiplicity of similar transceivers, comprising:

analog-to-digital convertor means for generating a new message in digitalized format corresponding to audio frequency message signals in analog format applied to said convertor means;

memory means connected to said convertor means for storing said digitalized new message;

message coding means;

central data processing means connected with and controlling said coding means, convertor means and memory means, and for adding a priority rating code, a recipient identity code and a sender's identity code to said new message;

message reception means for monitoring said channel to detect other messages broadcast one at a time thereon by others of said transceivers;

coding comparator means connected to said message reception means and said data processing means for comparing the priority rating of each of said other messages with the priority rating of said new message; and message broadcast means connected to said memory and under control of said data processing means for broadcasting said new message only when said channel is clear of any other message of equal or higher priority than that of said new message, and permits said new message to interrupt the broadcast of any other message of lower priority rating than that of said new message and interrupts said new messages when broadcast starts of any other message of higher priority than that of said new message; and said interrupted message is rebroadcast in its entirety when broadcast of the last named other message of higher priority is completed; whereby the possibility of any two messages being simultaneously broadcast with consequent loss of intelligibility, is eliminated.

2. Apparatus as defined in claim 1, wherein said analog-to-digital convertor means is arranged and said central data processing means is programmed to control said convertor means and said digitalized new message is compressed by eliminating redundant pulses therefrom to minimize broadcast transmission time of each message broadcast on said channel.

3. Apparatus as defined in claim 2, further comprising encryption coding means connected to said data processing means and said memory means for encrypting said new message to provide a measure of security and privacy to said new message when broadcast.

4. Apparatus as defined in claim 2, wherein said message broadcast means comprises digital-to-analog convertor means connected to said memory means to regenerate said new message in compressed, analog format for broadcast.

5. Apparatus as defined in claim 4, wherein said message reception means comprises:
received message storage means; and
said central data processing means includes code identifier recipient means connected to said received message storage means to permit storage therein of only those received messages identified as intended for reception by said message reception means.

6. Apparatus as defined in claim 5, further comprising message playback means connected to said received message storage means and said data processing means, for playing back one at a time said stored received messages.

7. Apparatus as defined in claim 6, further including a priority code identifier means is connected to said data processing means, to identify the priority rating of each stored received message and to permit said stored received messages to be played back only in order of their assigned priority, regardless of the numerical order in which said stored messages were received.

8. Apparatus as defined in claim 7, wherein said playback means is connected to said message reception means and arranged so that playback of any stored message of lower priority rating is interrupted when any other message of higher priority rating is received, and playback of said stored message of lower priority is played back in its entirety after playback of said last named other message of higher priority rating is completed.

9. In a transceiver transmitting and receiving messages broadcast one at a time on a radio frequency channel by a multiplicity of transceivers, wherein each of said messages has a compressed format and includes coding indicating the intended recipient of the message and a priority rating assigned to said message, apparatus comprising:

receiver means for receiving said messages;
code identification means connected to said receiver means for identifying the assigned priority of each of said received messages by said receiver means;
first message storage means connected to said receiver means for storing messages.
second storage means connected to said first storage means for storing only those messages intended for reception by said receiving means;
playback means connected to said second storage means for playing back said stored messages; and
message data processing means connected to said first storage means for identifying which of said received messages are intended for reception by said receiver means; and wherein said data processing means is also connected to said second storage means for permitting the messages intended for reception to be stored therein and connected to said code identification means and said playback means and programmed to playback said messages stored in only said second storage means in the order of their assigned priority rating and regardless of the numerical order in which they were received.

10. Apparatus as defined in claim 9, wherein said data processing means is further arranged and programmed:
to interrupt playback of any message having any assigned lower priority when another message having a higher priority is received by said receiver means,
to permit immediate playback of said other message, and
to permit playback in its entirety said message of lower priority after playback of said other message of higher priority is completed.

11. Apparatus as defined in claim 10, wherein said receiver means comprises demodulator means for demodualting said received messages to produce demodulated messages in compressed analog format, said apparatus further comprising analog-to-digital convertor means connected to said demodulator means for reproducing said messages in expanded digitalized format, said data processing means being adapted to manipulate said received and stored messages in digitalized format.

12. Apparatus as defined in claim 11, wherein said playback means comprises digital-to-analog convertor means for converting said stored messages to analog format; and
message reproducing means connected to with said digital-to-analog convertor means for playing back in analog format said messages converted to analog format by said digital-to-analog convertor.

* * * * *